United States Patent [19]

Rath et al.

[11] Patent Number: 5,191,044
[45] Date of Patent: Mar. 2, 1993

[54] PREPARATION OF POLYISOBUTENE

[75] Inventors: Hans P. Rath, Gruenstadt; Herwig Hoffmann, Frankenthal; Peter Reuter, Mannheim; Helmut Mach, Heidelberg, all of Fed. Rep. of Germany

[73] Assignee: BASF Aktiengesellschaft, Ludwigshafen, Fed. Rep. of Germany

[21] Appl. No.: 772,804

[22] Filed: Oct. 8, 1991

[30] Foreign Application Priority Data

Oct. 19, 1990 [DE] Fed. Rep. of Germany ....... 4033196

[51] Int. Cl.$^5$ ................................................ C08F 2/00
[52] U.S. Cl. .................................... 526/212; 526/237; 526/348.7
[58] Field of Search ..................... 526/237, 348.7, 212; 585/525

[56] References Cited

U.S. PATENT DOCUMENTS 4,152,499  5/1979  Boerzel et al. .
4,391,959  7/1983  Fauth et al. ........................ 526/70

FOREIGN PATENT DOCUMENTS 145235  6/1985  European Pat. Off. ............ 526/212
2702604  7/1978  Fed. Rep. of Germany .

OTHER PUBLICATIONS

Polymer Bulletin 6. 47-54 (1981).

*Primary Examiner*—Joseph L. Schofer
*Assistant Examiner*—David Wu
*Attorney, Agent, or Firm*—Keil & Weinkauf

[57] ABSTRACT

A process for the preparation of polyisobutene from isobutene and/or hydrocarbons containing isobutene in the presence of a complex of $BF_3$ and an alcohol, wherein the free $BF_3$ is substantially removed from the complex solution and/or from the reaction chamber.

4 Claims, No Drawings

PREPARATION OF POLYISOBUTENE

The present invention relates to a novel and improved process for the preparation of polyisobutene from isobutene and/or a hydrocarbon containing isobutene, in the presence of a complex of $BF_3$ and an alcohol.

The polymerization of isobutene using various initiators, including borontrifluoride, is a generally known procedure, as disclosed, for example, in "*High Polymers*", Vol. XXIV (J. Wiley & Sons, Inc. New York, 1971), pp. 713 ff. The degree of polymerization (DP) of the products obtained varies according to which of the various known polymerization techniques is used. Polymers having a DP of from 10 to 100 are particularly useful as intermediates for petroleum auxiliaries. These polyisobutenes (which should, more correctly, be referred to as 'oligo-isobutenes'—a term rarely used in the literature, however) are either chlorinated, maleated, or hydroformylated in the first stage of a pseudopolymeric reaction. In the reaction stages which follow, the chlorinated polymer is dehydrohalogenated and reacted with a polyamine or maleic anhydride, the oxo product is aminated by reduction with an amine or $NH_3$, and the maleated product obtained by heating or treatment with chlorine is reacted with a polyamine. The resulting polybutene amines are mainly used as gasoline additives and the polyisobutenyl succinimides as additives for lubricating oils.

DE-A 2,702,604 describes a process for the preparation of polyisobutenes from isobutene under a blanket of gaseous $BF_3$ acting as polymerization catalyst, which process produces a polyisobutene containing from 60 to 90% of terminal (i.e. reactive) double bonds.

EP-A 145,235 discloses the use of complex of $BF_3$ with a $C_1$-$C_8$-alkanol for the production of polyisobutene which also yields, according to the disclosure, a polyisobutene containing from 70 to 90% of terminal double bonds.

The process disclosed in DE-A 2,702,604 requires the use of gaseous $BF_3$ and in this case the geometry of the nozzles and the pressure conditions used are of considerable importance. A particularly undesirable side effect is the change of nozzle geometry caused by corrosion or choking of the $BF_3$ nozzles. When a $BF_3$ complex is used, as demanded in EP-A 145,235, it is essential to provide good distribution of the insoluble complex, which in turn calls for a high degree of turbulence or for thorough stirring. The use of the $BF_3$/alcohol complex prepared by blowing $BF_3$ into the reactor or produced therein in situ has proven to be unsatisfactory.

It is thus an object of the present invention to overcome the aforementioned drawbacks.

Thus we have found a novel and improved process for the preparation of polyisobutene from isobutene and/or a hydrocarbon containing isobutene, in the presence of a complex of $BF_3$ and an alcohol, in which the free $BF_3$ is substantially removed from the complex solution and/or the reaction chamber.

PREPARATION OF THE $BF_3$/ALKANOL COMPLEX

The $BF_3$/alkanol complex may be formed by passing $BF_3$ into a $C_1$-$C_{21}$-alkanol or mixture of such alkanols, with or without pressurization, at a temperature of from $-30°$ to $+20°$ C., preferably from $-20°$ to $0°$ C., and optionally in the presence of an inert solvent. If pressure is applied, this is suitably done using a pressure of from 1.2 to 10 bar. Use will generally be made of a 0.05M to 14M solution, preferably a 0.05M to 3M solution, of the complex in an inert hydrocarbon. In a preferred embodiment, the complex solution is prepared by passing $BF_3$ into a, say, 2M solution of isotridecanol in hexane to saturation, after which the dissolved, non-complexed $BF_3$ gas is removed by extraction by bubbling a dry inert gas such as nitrogen or argon through the solution or by applying a vacuum of approx. 100 mbar, until the residual content of said $BF_3$ gas is substantially from 0 to 5% w/w, preferably from 0 to 0.5% w/w. The solution is then diluted to 0.1M with, say, hexane, after which a sufficient quantity of complexing agent comprising for example acids, phenols, water, or alcohols, particularly $C_1$-$C_{21}$-alkanols, is added until the overall molar ratio of $BF_3$ to complexing agent is between 0.5:1 and 0.95:1. The actual value used depends on the desired molecular weight of the intended polymer, the polymerization temperature used, the degree of conversion of the isobutene achieved, and, ultimately, on the residence time, and is kept between 0.5:1 and 0.95:1. Partial conversion is conducive to good quality products. In order to lower the molar ratio of the $BF_3$ to the complexing agent, a further quantity of the latter is required. One or more complexing agents may be used for this purpose, and the reduction of the molar ratio may be effected before and/or after the starting materials are fed to the reactor. If it is desired to mix the $BF_3$ complex with further complexing agent some time before it is fed to the reactor, it will be usual, for solubility reasons, to choose the same complexing agent, in order to avoid separation of the substances. The nearer the time for entry into the reactor approaches, the more it is possible to use complexing agents of higher polarity which produce complexes that are no longer soluble and which are mainly formed in the reactor in situ as monomolecular units. A similar effect is gained by feeding the additional complexing agent in a separate stream or together with the solvent present in the isobutene or isobutene-containing hydrocarbons. The use of a separate stream, optionally together with a solvent, is particularly advantageous for regulating reasons, because the reactor answers to changes more quickly and it is thus easier to compensate for deviations in the content of complexing agent in the feeds (usually water and methanol).

Examples of complexing agents which can be used in the preparation of the pre-formed $BF_3$ complex and which guarantee homogeneous catalysis are, among linear aliphatic primary alcohols, $C_9$-$C_{21}$-alkanols, particularly n-nonanol and n-decanol, n-undecanol and n-dodecanol, preferably n-nonanol and n-decanol. Of the oxo-alcohols, which on account of their branching remain liquid or in solution at low temperatures, the following are particularly suitable: isononanol, isodecanol, isotridecanol, and isoheptadecanol. They are readily obtained from the corresponding propene or butene oligomers by hydroformylation.

Complexing agents suitable for lowering the molar proportion of $BF_3$ are, in addition to $C_1$-$C_{21}$-alkanols, substituted or unsubstituted phenol, e.g. ortho-, meta-, and para-cresols, water, and $C_1$-$C_8$-carboxylic acids such as formic acid, acetic acid, propionic acid, pivalic acid, and ethylhexanoic acid.

Suitable alkanols are methanol, ethanol, n-propanol, butanol, and, in particular, $C_9$-$C_{21}$-alkanols and preferably $C_9$-$C_{17}$-alkanols such as n-nonanol and n-decanol, and also mixtures of more or less branched oxo-alcohols such as isononanol, isodecanol, isotridecanol, and isoheptadecanol. These long-chain alcohols are used to prepare the pre-formed $BF_3$ complex and assure homogeneous catalysis.

Suitable inert solvents are $C_5$–$C_{20}$-alkanes, preferably $C_5$–$C_{12}$-alkanes such as n-pentane, isopentane, n-hexane, n-heptane, iso-octane, and isododecane, and $C_5$–$C_8$-cycloalkanes such as cyclopentane, cyclohexane, cycloheptane, and cyclo-octane.

The preparation of polyisobutenes from isobutene and/or isobutene-containing LPG's in the presence of a complex of $BF_3$ with a $C_1$–$C_{21}$-alkanol may be effected by polymerization in conventional reactors such as stirred-tank reactors, mono-tube or multiple-tube reactors, and loop reactors as a batch process, a semibatch process, or a continuous process. The preferred continuous-flow reactors are loop reactors (mono-tube or multiple-tube reactors having stirred-tank characteristics). It is particularly advantageous to use tube cross-sections which cause turbulence over certain sections of the tube(s). Linings of plastics materials such as polytetrafluoroethylene, polyethylene, or polypropylene are also advantageous, since they reduce corrosion problems.

Using such equipment, isobutene, isobutene-containing solvents or LPG's may be mixed with a catalyst comprising a pre-formed complex of $BF_3$, a $C_1$–$C_{21}$-alkanol, and optionally an inert solvent, the heat of reaction being removed by cooling. The concentration of complex in the catalyst solution used in the process of the invention advantageously ranges from the $BF_3$-saturated alcohol down to a 1% solution in hexane. A low viscosity of the complex solution facilitates both preparation and pouring thereof.

The polymerization is advantageously carried out isothermally using a substantially constant monomer concentration. This produces a narrow molecular weight distribution giving a value for $M_w/M_N$ as low as 1.2, where $M_w$ and $M_N$ have the meanings stated in EP-A 195,910.

The temperatures used for polymerization are generally below 0° C., and the conversion of isobutene preferably ranges from 20 to 100% depending on process, residence time, and catalyst concentration. Control of the isobutene conversion significantly affects the final quality of the polymer. Steady-state conditions are achieved within a few hours after commencement of the reaction.

The residence time advantageously ranges from 10 seconds to several hours. The catalyst concentration is advantageously between 500 and 10,000 mg of $BF_3$ per kg of isobutene. The isobutene, LPG's, and solvents may be in admixture with complexing agents, especially water and alcohols, or freed therefrom. It is particularly preferred to dry the feeds by distillation or adsorption. The consumption of catalyst is greater the higher the concentration of complexing agent.

The product is conveniently worked up by terminating the reaction with ammonia or a 5 to 50% w/w aqueous caustic soda solution, followed by washing with water a number of times and purification by distillation. The desired product constitutes the bottoms obtained following distillation at 240° C./1 mbar.

EXAMPLES

EXAMPLE 1

| A mixture ($C_4$ cut) of | |
|---|---|
| isobutane | 4.0% |
| n-butane | 9.2% |
| butene-1 | 29.0% |
| trans-butene-2 | 7.7% |
| cis-butene-2 | 4.5% |
| isobutene | 45.4% |
| butadiene | <50 ppm |
| having a water content of approx. 2 ppm | | is continuously reacted at a rate of 900 ml/h with 40 ml/h of a 0.1M $BF_3$/isotridecanol catalyst solution freshly prepared in hexane at atmospheric pressure and a temperature of from −15° to 10° C. and substantially freed from excess $BF_3$ by treatment at 20° C./100 mbar for 10 minutes, the reaction being carried out in a reactor (e.g. a loop reactor) under autogenous pressure. The effluent is then neutralized with 10% w/w caustic soda solution to liberate unused isobutene and other hydrocarbons (LPG's). The product is then taken up in hexane and washed with water, and the low-boiling fractions are removed at a maximum temperature of 230° C. under 1 mbar.

The results are listed in Table 1 below.

EXAMPLE 2

The reaction is carried out as described in Example 1, except that the degassed complex is stored for 48 hours before use.

The results are given in Table 1 below.

EXAMPLE 3

The reaction is carried out as described in Example 2, except that the complex is again degassed, in the manner described in Example 1, before it is used.

The results are listed in Table 1 below.

EXAMPLE 4

The reaction is carried out as described in Example 1, except that degassing is achieved by purging with nitrogen. This is done by vigorously stirring the complex solution for about 30 minutes while nitrogen is bubbled through via a frit, after which the catalyst solution is immediately fed to the polymerization.

The results are listed in Table 1 below.

EXAMPLE 5

A complex of anhydrous methanol and $BF_3$ is prepared by bubbling gaseous $BF_3$ through methanol at −15° C. The complex is then subjected to a vacuum of 100 mbar for 10 minutes, and the molar ratio of $BF_3$ to complexing agent is lowered to 0.9:1 by the addition of water. The complex solution thus obtained is used in a polymerization carried out as described in Example 1.

The results are listed in Table 1 below.

EXAMPLE 6

A 2M solution of isononanol in hexane is saturated with $BF_3$ at 10° C. The molar ratio of $BF_3$ to complexing agent is then lowered from 1:1 to 0.8:1 by the addition of isononanol, and the solution is degassed at 100 mbar for 10 minutes at 20° C. and then immediately fed to the polymerization carried out as described in Example 1.

The results are listed in Table 1 below.

EXAMPLE 7

A 2M solution of isotridecanol in hexane is saturated with $BF_3$ at 10° C. and adjusted to a molar ratio of $BF_3$ to complexing agent of 0.95:1 with methanol. It is then used as catalyst for a polymerization carried out as described in Example 1.

The results are listed in Table 1 below.

EXAMPLE 8

A 2M solution of isotridecanol in hexane is saturated with $BF_3$ at 10° C. and adjusted to a molar ratio of $BF_3$ to complexing agent of 0.95:1 with isotridecanol. This ratio is then lowered to 0.9:1 with methanol, and the solution is used in the polymerization without further treatment.

The results are listed in Table 1 below.

Comparative Example A (cf. DE-A 145,235, Example 1)

A saturated ethanol/$BF_3$ complex, prepared at −15° C., is adjusted to 0.1M with dry methanol. The solution is used, without further treatment, in a polymerization carried out as described in Example 1. The water content of the $C_4$ cut is previously reduced to exactly 2 ppm using a molecular sieve having a pore size of 0.3 nm.

The results are listed in Table 1 below.

Comparative Example B (cf. DE-A 145,235)

A 0.1M solution of isotridecanol in hexane is saturated with $BF_3$ at −15° C. and then used, without further treatment, in a polymerization carried out as described in Example A.

The results are listed in Table 1 below.

TABLE 1

Isobutene Polymerization Tests Using Variously Prepared $BF_3$/Alcohol Complexes

| Example | $BF_3$/Isobutene [mg/kg] | Molar Ratio of $BF_3$ to Complexing Agent | Reactor Temp. [°C.] | Conversion [%] | Yield of Polymer [%] | Mol. Wt. $M_n$ | Terminal Double Bonds [%] |
|---|---|---|---|---|---|---|---|
| A* | 2,000 | 1.10:1 | −9 | 98 | 49 | 1,750 | 25 |
| B* | 800 | 1.20:1 | −12 | 78 | 99 | 2,300 | 34 |
| 1 | 2,000 | 1.00:1 | −10 | 85 | 96 | 1,210 | 52 |
| 2 | 2,500 | 1.00:1 | −10 | 86 | 97 | 1,360 | 47 |
| 3 | 2,500 | 0.98:1 | −12 | 79 | 95 | 1,170 | 55 |
| 4 | 2,000 | 1.00:1 | −10 | 90 | 96 | 1,380 | 49 |
| 5 | 5,000 | 0.90:1 | −12 | 82 | 89 | 930 | 79 |
| 6 | 4,000 | 0.80:1 | −13 | 73 | 90 | 1,050 | 65 |
| 7 | 4,000 | 0.95:1 | −13 | 76 | 89 | 1,130 | 71 |
| 8 | 4,000 | 0.90:1 | −13 | 69 | 87 | 970 | 76 |

*(Comparative Example)

We claim:

1. In a process for producing polyisobutene by polymerizing isobutene and/or hydrocarbons containing isobutene in the presence of a complex of $BF_3$ and an alcohol in which the molar ratio of $BF_3$ to the alcohol and any additional complexing agent in the complex is from 0.5:1 to 0.95:1, the improvement which comprises substantially removing free $BF_3$ from the complex, its solution and/or from the reaction chamber prior to the polymerization.

2. The improved process of claim 1, wherein the free $BF_3$ is removed by bubbling a dry inert gas through the solution or by applying a vacuum or by adding complexing agent.

3. The improved process of claim 1, wherein the free $BF_3$ is removed from a solution of the complex by bubbling a dry inert gas through the solution.

4. The improved process of claim 3, wherein the inert gas is nitrogen or argon.

* * * * *